US011370068B2

(12) United States Patent
Berube et al.

(10) Patent No.: US 11,370,068 B2
(45) Date of Patent: *Jun. 28, 2022

(54) SYSTEMS AND METHODS FOR ADDITIVE MANUFACTURING USING ALUMINUM METAL-CORED WIRE

(71) Applicant: HOBART BROTHERS LLC, Troy, OH (US)

(72) Inventors: Patrick Berube, Traverse City, MI (US); Gregory J. Bramer, Traverse City, MI (US); Shuang Liu, Appleton, WI (US)

(73) Assignee: HOBART BROTHERS LLC, Troy, OH (US)

( * ) Notice: Subject to any disclaimer, the term of this patent is extended or adjusted under 35 U.S.C. 154(b) by 402 days.

This patent is subject to a terminal disclaimer.

(21) Appl. No.: 16/358,419

(22) Filed: Mar. 19, 2019

(65) Prior Publication Data
US 2019/0210163 A1    Jul. 11, 2019

Related U.S. Application Data (63) Continuation-in-part of application No. 14/839,420, filed on Aug. 28, 2015, now Pat. No. 10,421,159.
(Continued)

(51) Int. Cl.
*B23K 35/28* (2006.01)
*B22F 1/00* (2022.01)
(Continued)

(52) U.S. Cl.
CPC .......... *B23K 35/288* (2013.01); *B22F 1/0007* (2013.01); *B22F 9/04* (2013.01);
(Continued)

(58) Field of Classification Search
CPC .......... B23K 35/0266; B23K 35/286; B23K 35/406; B23K 35/0244; B23K 35/288;
(Continued)

(56) References Cited

U.S. PATENT DOCUMENTS 2,111,791 A * 3/1938 Larson ................. B23K 9/0026
219/76.14
2,191,471 A * 2/1940 Hopkins ................. B23K 9/038
219/73.21
(Continued)

FOREIGN PATENT DOCUMENTS

| CN | 1374167 | 10/2002 |
|----|---------|---------|
| CN | 101920403 | 12/2010 |

(Continued)

OTHER PUBLICATIONS

Alcotech Wire Corporation: "Alloy 4643 Weld Data Sheet," Jan. 1, 2013. http://www.alcotec.com/us/en/support/upload/a4643tds.pdf.
(Continued)

*Primary Examiner* — Eric S Stapleton
(74) *Attorney, Agent, or Firm* — McAndrews Held & Malloy, Ltd.

(57) ABSTRACT

A method of forming an additively manufactured aluminum part includes establishing an arc between a metal-cored aluminum wire and the additively manufactured aluminum part, wherein the metal-cored aluminum wire includes a metallic sheath and a granular core disposed within the metallic sheath. The granular core comprises aluminum metal matrix nano-composites (Al-MMNCs) that comprise an aluminum metal matrix and ceramic nanoparticles. The method includes melting a portion of the metal-cored aluminum wire using the heat of the arc to form molten droplets. The method includes transferring the molten droplets to the additively manufactured aluminum part under an inert gas flow, and solidifying the molten droplets under the
(Continued)

inert gas flow to form deposits of the additively manufactured aluminum part.

21 Claims, 3 Drawing Sheets

Related U.S. Application Data

(60) Provisional application No. 62/120,752, filed on Feb. 25, 2015.

(51) Int. Cl.
| | |
|---|---|
| B22F 9/04 | (2006.01) |
| B23K 35/02 | (2006.01) |
| B23K 9/04 | (2006.01) |
| B23K 9/173 | (2006.01) |
| B23K 9/23 | (2006.01) |
| C22C 21/14 | (2006.01) |
| C22C 1/10 | (2006.01) |
| C22C 21/16 | (2006.01) |
| C22C 21/02 | (2006.01) |
| C22C 21/06 | (2006.01) |
| B22F 10/20 | (2021.01) |
| B33Y 10/00 | (2015.01) |
| C22C 1/04 | (2006.01) |
| B23K 103/10 | (2006.01) |
| B22F 3/115 | (2006.01) |

(52) U.S. Cl.
CPC ............... B22F 10/20 (2021.01); B23K 9/04 (2013.01); B23K 9/044 (2013.01); B23K 9/173 (2013.01); B23K 9/23 (2013.01); B23K 35/0261 (2013.01); C22C 1/10 (2013.01); C22C 21/02 (2013.01); C22C 21/06 (2013.01); C22C 21/14 (2013.01); C22C 21/16 (2013.01); B22F 3/115 (2013.01); B22F 2301/052 (2013.01); B22F 2998/10 (2013.01); B23K 2103/10 (2018.08); B33Y 10/00 (2014.12); C22C 1/0416 (2013.01)

(58) Field of Classification Search
CPC ...... B23K 35/0261; B23K 9/23; B23K 9/173; B23K 9/133; B23K 9/0953; B23K 9/04; B23K 9/044; B23K 2103/10; B33Y 10/00; B33Y 80/00; B33Y 70/00; B33Y 50/02; B33Y 30/00; B22F 10/20; B22F 9/04; B22F 1/0007; B22F 2998/10; B22F 3/115; B22F 2301/052; Y02P 10/25; C22C 21/18; C22C 21/14; C22C 21/10; C22C 21/08; C22C 21/02; C22C 21/16; C22C 21/06; C22C 21/0416
USPC .......... 219/121.63, 121.64, 121.84, 137 WM
See application file for complete search history.

(56) References Cited

U.S. PATENT DOCUMENTS

| | | | | |
|---|---|---|---|---|
| 2,508,008 A * | 5/1950 | Block | ................... | B23K 35/286 420/548 |
| 2,785,285 A * | 3/1957 | Bernard | ............. | B23K 35/0266 219/146.22 |
| 2,909,778 A * | 10/1959 | Landis | ............... | B23K 35/3053 219/146.3 |
| 3,071,678 A * | 1/1963 | Neely | ................... | H05H 1/3405 219/76.16 |
| 3,271,554 A * | 9/1966 | Johnson | ................... | B23K 9/04 219/76.12 |
| 3,322,517 A * | 5/1967 | Miller | ................... | B23K 35/286 428/654 |
| 3,337,712 A * | 8/1967 | Lucey | ................... | B23K 25/00 219/136 |
| 3,340,597 A * | 9/1967 | Stein | ................... | B23K 20/2275 228/206 |
| 3,373,482 A * | 3/1968 | Miller | ...................... | B23K 1/19 228/221 |
| 3,373,483 A * | 3/1968 | Miller | ................... | B23K 35/286 228/221 |
| 3,381,366 A * | 5/1968 | Winter | ............... | B23K 20/2333 228/172 |
| 3,458,681 A * | 7/1969 | Forrester | ............ | B23K 35/0261 219/74 |
| 3,496,621 A * | 2/1970 | Winter | .................... | B32B 15/01 428/612 |
| 3,810,287 A * | 5/1974 | Pryor | ................... | B23K 20/2333 428/607 |
| 3,852,873 A * | 12/1974 | Chartet | ................ | B23K 35/286 228/207 |
| 3,891,400 A * | 6/1975 | Robinson | .............. | B32B 15/016 428/654 |
| 3,963,453 A * | 6/1976 | Singleton, Jr. | ........ | B23K 35/002 428/654 |
| 3,963,454 A * | 6/1976 | Singleton, Jr. | ........ | B23K 35/002 428/654 |
| 4,098,957 A * | 7/1978 | Vernam | ................ | B23K 35/286 428/654 |
| 4,146,163 A * | 3/1979 | Anderson | ............... | B23K 20/04 228/158 |
| 4,229,643 A * | 10/1980 | Caldwell | ................ | B23K 25/00 219/146.1 |
| 4,326,662 A * | 4/1982 | Anderson | ................ | B23K 1/06 228/111 |
| 4,683,368 A * | 7/1987 | Das | .................... | B23K 35/0255 219/146.1 |
| 4,716,959 A * | 1/1988 | Aoki | ........................ | B23K 1/19 165/152 |
| 4,723,060 A * | 2/1988 | Arnoldy | ................ | B23K 9/324 219/73 |
| 4,970,091 A * | 11/1990 | Buhrmaster | .......... | C22C 1/1042 427/192 |
| 5,052,331 A * | 10/1991 | Buhrmaster | ............. | B22F 9/14 118/50.1 |
| 5,294,242 A * | 3/1994 | Zurecki | .................... | B22F 9/14 75/10.1 |
| 5,418,072 A * | 5/1995 | Baldantoni | ........ | B23K 35/0227 428/558 |
| 5,512,081 A * | 4/1996 | DelGrosso | ........... | B23K 35/286 75/255 |
| 5,576,112 A * | 11/1996 | Izuchi | ..................... | C22C 21/02 428/654 |
| 5,728,479 A * | 3/1998 | Childree | ............ | B23K 35/0238 228/262.51 |
| 5,781,846 A * | 7/1998 | Jossick | ............... | B23K 35/0227 29/527.2 |
| 5,971,258 A * | 10/1999 | Eichhorn | ............ | B32B 15/016 148/528 |
| 5,994,664 A * | 11/1999 | Anderton | ............... | B23P 15/00 219/121.64 |
| 6,261,706 B1 * | 7/2001 | Fukuda | ................. | B32B 15/016 165/133 |
| 6,265,701 B1 * | 7/2001 | Bickel | ...................... | B23K 9/00 219/136 |
| 6,428,596 B1 * | 8/2002 | Urevich | ................. | B22F 1/0014 419/14 |
| 6,440,583 B1 * | 8/2002 | Ueno | ................... | B23K 35/286 148/439 |
| 6,513,728 B1 * | 2/2003 | Hughes | ................... | C23C 4/131 219/121.47 |
| 6,534,745 B1 * | 3/2003 | Lowney | ................. | B23K 26/1482 219/121.84 |
| 6,674,047 B1 * | 1/2004 | Hughes | ............. | B23K 35/0266 219/145.22 |
| 6,933,468 B2 * | 8/2005 | Keegan | ............... | B23K 35/0266 219/145.22 |

(56) References Cited

U.S. PATENT DOCUMENTS

| | | | |
|---|---|---|---|
| 6,957,762 B2 | 10/2005 | Kroetsch | |
| 7,247,392 B2* | 7/2007 | Sugano | F28F 19/06 148/535 |
| 7,645,493 B2* | 1/2010 | Seitz | C23C 4/131 427/449 |
| 7,842,900 B2* | 11/2010 | Longfield | B23K 26/147 219/121.64 |
| 8,901,453 B2* | 12/2014 | Miyagi | B23K 35/38 219/121.63 |
| 8,975,559 B1* | 3/2015 | Keegan | B23K 35/286 219/146.1 |
| 9,029,733 B2 | 5/2015 | Barhorst | C22C 38/02 219/137 R |
| 9,085,041 B2* | 7/2015 | Peters | B23K 35/0261 |
| 9,782,850 B2* | 10/2017 | Peters | B23K 26/34 |
| 10,086,477 B2* | 10/2018 | Howard | B23K 35/0227 |
| 10,421,159 B2* | 9/2019 | Berube | B23K 9/133 |
| 2001/0006607 A1* | 7/2001 | Bekki | B21C 23/01 420/532 |
| 2001/0040153 A1* | 11/2001 | Lanouette | B23K 9/1006 219/130.21 |
| 2002/0012810 A1* | 1/2002 | Osame | B23K 35/3605 428/650 |
| 2002/0088717 A1* | 7/2002 | Wittebrood | B23K 20/023 205/259 |
| 2003/0021251 A1* | 1/2003 | Moshiri-Tafreshi | H04W 24/04 370/338 |
| 2003/0062355 A1* | 4/2003 | Ikegami | B23K 9/1735 219/137 PS |
| 2003/0098296 A1* | 5/2003 | Keegan | B23K 35/286 219/145.22 |
| 2003/0201251 A1* | 10/2003 | Barbezat | B05B 7/224 219/76.14 |
| 2004/0155095 A1* | 8/2004 | Kroetsch | C22C 21/08 228/246 |
| 2004/0234687 A1* | 11/2004 | Schmid | C23C 4/12 427/248.1 |
| 2005/0023258 A1* | 2/2005 | Tsushima | B23K 26/32 219/121.64 |
| 2005/0079376 A1* | 4/2005 | Benedictus | B23K 1/0012 428/654 |
| 2005/0121426 A1* | 6/2005 | Wang | B23K 26/244 219/121.64 |
| 2005/0271542 A1* | 12/2005 | Frankel | C22C 19/03 420/457 |
| 2006/0027625 A1* | 2/2006 | Dockus | B23K 35/282 228/56.3 |
| 2006/0035100 A1* | 2/2006 | Goodrich | F28F 21/084 428/615 |
| 2006/0177688 A1* | 8/2006 | Meijers | B23K 35/0233 428/654 |
| 2006/0243719 A1* | 11/2006 | Inoue | B23K 35/26 219/146.41 |
| 2006/0266794 A1* | 11/2006 | Melfi | B23K 35/0272 228/56.3 |
| 2007/0045260 A1* | 3/2007 | Feng | B23K 9/23 219/137 WM |
| 2007/0187379 A1* | 8/2007 | Osuki | C22C 19/058 219/137 WM |
| 2008/0098926 A1* | 5/2008 | Seitz | B23K 35/0266 106/14.05 |
| 2008/0193792 A1* | 8/2008 | Cottignies | C22C 21/06 428/654 |
| 2008/0257870 A1* | 10/2008 | Longfield | B23K 26/242 219/121.64 |
| 2009/0078689 A1* | 3/2009 | Brass | B23K 9/048 219/162 |
| 2009/0140030 A1* | 6/2009 | Amancherla | B23K 35/0244 228/208 |
| 2009/0304943 A1* | 12/2009 | Gollob | C04B 35/573 427/450 |
| 2011/0194973 A1* | 8/2011 | Anderson | B23K 35/288 420/534 |
| 2011/0204124 A1* | 8/2011 | Wittebrood | B23K 1/0012 228/219 |
| 2012/0006881 A1* | 1/2012 | Fuerstenau | B23K 35/0266 228/56.3 |
| 2012/0121896 A1* | 5/2012 | Ning | C23C 2/12 428/336 |
| 2012/0325779 A1* | 12/2012 | Yelistratov | B23K 9/04 219/76.14 |
| 2013/0140278 A1* | 6/2013 | Bruck | B23K 35/304 219/73.11 |
| 2013/0140279 A1* | 6/2013 | Bruck | B23K 26/082 219/73.11 |
| 2013/0153557 A1* | 6/2013 | Pagano | B23K 9/09 219/130.51 |
| 2013/0270244 A1* | 10/2013 | Barhorst | C22C 38/04 219/137 R |
| 2013/0313240 A1* | 11/2013 | Amata | B23K 35/36 219/137.2 |
| 2014/0174606 A1* | 6/2014 | Nagae | B23K 35/3605 148/26 |
| 2014/0190952 A1* | 7/2014 | Anderson | B23K 35/28 219/146.22 |
| 2014/0329109 A1* | 11/2014 | Takewaka | C22C 21/02 428/654 |
| 2015/0021815 A1* | 1/2015 | Albrecht | B23K 9/232 264/235 |
| 2015/0037607 A1* | 2/2015 | Itoh | F28F 21/089 428/654 |
| 2015/0053751 A1* | 2/2015 | Eckhard | F28F 21/084 228/117 |
| 2015/0118517 A1* | 4/2015 | Itoh | C22C 21/02 428/654 |
| 2015/0239072 A1* | 8/2015 | Barhorst | B23K 35/0261 219/73 |
| 2015/0321294 A1* | 11/2015 | Anderson | B23K 35/286 420/531 |
| 2016/0325367 A1* | 11/2016 | Eckhard | B23K 1/0012 |

FOREIGN PATENT DOCUMENTS

| | | |
|---|---|---|
| CN | 101941121 | 1/2011 |
| CN | 102079020 | 6/2011 |
| CN | 102139424 | 8/2011 |
| CN | 102935562 | 2/2013 |
| CN | 202963800 | 6/2013 |
| CN | 103920965 | 7/2014 |
| CN | 104093517 | 10/2014 |
| CN | 108796251 | 11/2018 |
| EP | 0004096 | 9/1979 |
| EP | 0039153 | 11/1981 |
| EP | 2913141 | 9/2015 |
| EP | 3135419 | 3/2017 |
| GB | 1020628 | 2/1966 |
| GB | 2159176 | 11/1985 |
| JP | S58031055 | 2/1983 |
| JP | H02034297 | 2/1990 |
| JP | H04127970 | 4/1992 |
| JP | H05208296 | 8/1993 |
| JP | H06000640 | 1/1994 |
| JP | H06182582 | 7/1994 |
| JP | H07252630 | 10/1995 |
| JP | H06000687 | 1/1997 |
| JP | 2001138059 | 5/2001 |
| WO | 9838347 | 9/1998 |
| WO | 02090031 | 11/2002 |
| WO | 2009156607 | 12/2009 |
| WO | 2010000666 | 1/2010 |
| WO | 2012043030 | 4/2012 |

(56) References Cited

FOREIGN PATENT DOCUMENTS

| WO | 2012121086 | 9/2012 |
| WO | 2016145382 | 9/2016 |

OTHER PUBLICATIONS

Chu, Jijun; "Aluminium and Aluminium Alloy Wires and Rods," GB/T 10858-2008, Apr. 16, 2008.

Davis, J.R., "Aluminum and Aluminum Alloys," ASM Specialty Handbook, ASM International, 1993, p. 639.

International Search Report from PCT application No. PCT/US2011/024064, dated May 9, 2011, 4 pgs.

International Search Report from PCT application No. PCT/US2014/066282, dated Mar. 9, 2015, 11 pgs.

International Search Report from PCT application No. PCT/US2016/043164, dated Sep. 1, 2016, 12 pgs.

Osterman, Virginia, et al., ed.; "Critical Melting Points and Reference Data for Vacuum Heat Treating," Vacuum Furnace Reference Series 1, Solar Atmospheres Inc., Sep. 2010.

P.B. Dickerson, 'Welding of Aluminum Alloys, Welding, Brazing, and Soldering,' vol. 6, ASM Handbook, ASM Internationl, 1993, p. 722-739.

R.B.C. Cayless, "Alloy and Temper Designation Systems for Aluminum and Aluminum Alloys, Properties and Selection; Nonferrous Alloys and Special-Purpose Materials," vol. 2, ASM Handbook, ASM International, 1990, p. 15-28.

U.S. Welding Corporation: 'World class welding wire for crotical applications; Technical Data Sheets & Material Data Sheets'; US, Jan. 1, 2010 (Jan. 1, 2010), XP002634245, Retrieved from Internet: URL:www.usweldingcorp.com/aluminum-alloys.htm [retrieved on Apr. 4, 2018] the whole document.

World STD Index, SAE AMS 4245C-2003 (2003). http://www.worldstdindex.com/soft2/754404.htm.

* cited by examiner

SYSTEMS AND METHODS FOR ADDITIVE MANUFACTURING USING ALUMINUM METAL-CORED WIRE

CROSS-REFERENCE TO RELATED APPLICATIONS

This application is continuation-in-part of U.S. application Ser. No. 14/839,420, filed Aug. 28, 2015, entitled "SYSTEMS AND METHODS FOR ADDITIVE MANUFACTURING USING ALUMINUM METAL-CORED WIRE," which claims priority from and the benefit of U.S. Provisional Application Ser. No. 62/120,752, filed Feb. 25, 2015, entitled "ALUMINUM METAL-CORED WELDING WIRE," the disclosure of each of which is hereby incorporated by reference in its entirety for all purposes.

BACKGROUND

The present disclosure relates to systems and methods for additive manufacturing using a tubular aluminum wire as a source material.

Additive manufacturing systems generally involve the construction of parts in a bottom-up fashion. In generally, in additive manufacturing, the parts may be formed in a deposit-by-deposit or layer-by-layer process, whereby a source material is successively deposited on top of itself to gradually form (e.g., build or print) a completed part. Additive manufacturing systems are useful for rapid prototyping, and can produce complex parts with a high degree of precision and with little waste of source material. Different additive manufacturing systems can use different types of source materials, such as metals, polymers, and ceramics, to construct different types of parts.

Aluminum and aluminum alloys are widely used as construction material due to their relatively low density and high corrosion resistance compared to other metals. For example, aluminum alloys may provide strengths between approximately 50 megapascal (MPa) and approximately 700 megapascal (MPa). Since aluminum has a high affinity for oxygen, aluminum part fabrication may involve the use of an inert shielding gas to limit or prevent the formation of aluminum oxide (alumina) and undesirable inclusions. It may also be desirable to fabricate aluminum parts with relatively low porosity. One prominent source of such pores may be hydrogen that is released from, and forms voids within, the solidifying metal during part fabrication. Hydrogen gas may be formed via the decomposition of hydrogen-containing materials (e.g., moisture or organic materials, such as lubricants) during aluminum part fabrication. As such, it is desirable to prevent hydrogen-containing materials from being introduced into the additive manufacturing environment.

Alloys reinforced by nanoparticles have gained interest in recent years due to the novel physical and chemical properties that such alloys often have. Nanoparticles may exhibit physical and chemical properties that differ from the corresponding microparticles and bulk materials, providing more effective options for many applications in various fields. For example, nanoparticles can be used in surface engineering to improve the abrasive wear resistance or to affect the tribological properties of lubricants; in electronic applications to change such properties as electrical conductivity, strength, and magnetic properties; and in welding or additive manufacturing applications to improve the mechanical properties such as Young's modulus, tensile strength, hardness, and fatigue strength.

BRIEF DESCRIPTION

In an embodiment, a method of forming an additively manufactured aluminum part includes establishing an arc between a metal-cored aluminum wire and the additively manufactured aluminum part, wherein the metal-cored aluminum wire includes a metallic sheath and a granular core disposed within the metallic sheath. The granular core comprises aluminum metal matrix nano-composites (Al-MMNCs) that comprise an aluminum metal matrix and ceramic nanoparticles. The ceramic nanoparticles may have an average particle size of between 25 and 250 nm. The method includes melting a portion of the metal-cored aluminum wire using the heat of the arc to form molten droplets. The method includes transferring the molten droplets to the additively manufactured aluminum part under an inert gas flow, and solidifying the molten droplets under the inert gas flow to form deposits of the additively manufactured aluminum part.

In an embodiment, an additive manufacturing system includes a torch configured to receive shielding gas and metal-cored aluminum wire. The metal-cored aluminum wire includes a metallic sheath and a granular core disposed within the metallic sheath. The granular core comprises Al-MMNCs that comprise an aluminum metal matrix and ceramic nanoparticles. The torch is configured to establish an arc between the metal-cored aluminum wire and an additively manufactured part. The torch is configured to form a molten portion of the metal-cored aluminum wire using the heat of the arc under an atmosphere of the shielding gas, and to transfer the molten portion to the additively manufactured part to form a deposit of the additively manufactured part under the atmosphere of the shielding gas.

In an embodiment, an additively manufactured aluminum alloy part includes a plurality of aluminum alloy deposits fused together to form a plurality of layers of the additively manufactured aluminum alloy part, wherein the additively manufactured aluminum alloy part is additively manufactured using a metal-cored aluminum wire that comprises a metallic sheath and a granular core disposed within the metallic sheath. The granular core comprises Al-MMNCs that comprise an aluminum metal matrix and ceramic nanoparticles.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value Likewise, two values described as being "substantially the same" or "substantially similar" are approximately the same, and a material that is described as being "substantially free" of a substance includes approximately 0% of the substance. The terms "metal-core" and "metal-cored" are used herein to refer to tubular wires having a metallic sheath and a granular core, wherein the core primarily includes metallic alloying powders with low amounts (i.e., less than about 5 wt %) of non-metallic components (e.g., slag forming agents, metal oxides, stabilizers, etc.). For example, see ANSI/ANS A5.9 Specifications for Bare Stainless Steel Welding Electrodes and Rods. As used herein, the term "non-metallic component" refers to elements and compounds of elements that are not metals or metalloids (e.g., hydrogen, carbon, nitrogen, oxygen, phosphorous, sulfur, halides).

As used herein, "melting point" refers to the temperature or temperature range at which a solid substance is converted to a liquid. When the solid substance is a mixture, as in the case of alloys and mixtures of powders, the melting point usually encompasses a range of temperatures between a solidus and a liquidus, in which "solidus" refers to the temperature at which the mixture begins to melt, and "liquidus" refers to the temperature at which the mixture is completely liquefied. In contrast, pure solid substances tend to have a sharp, narrow melting point (i.e., the solidus and liquidus are substantially the same). One exceptional mixture, discussed in greater detail below, is a eutectic alloy. As used herein, a "eutectic alloy" refers to an alloy in which the solidus and liquidus are substantially the same, resulting in a sharp melting point at its eutectic temperature, which is lower than the melting points of the individual elements of the alloy. As such, it may be appreciated that the terms "solidus" and "melting point" are herein used interchangeably when referring to substances with sharp melting points, such as pure substances and eutectic alloys. As used herein, a "near-eutectic alloy" refers to an alloy that is made from the same elemental components as a eutectic alloy, albeit using slightly different relative amounts of these elements, to yield a slightly hypoeutectic or hypereutectic composition, wherein the liquidus and solidus differ from one another by less than approximately 20% (e.g., less than approximately 10%, less than approximately 5%).

Present embodiments are directed toward systems and methods for additive manufacturing parts made of a diverse range of different aluminum alloys using tubular aluminum wires (i.e., metal-cored aluminum wires) as the source material. The disclosed metal-cored aluminum wires include a seamed or seamless aluminum or aluminum alloy sheath encircling a granular core, which is a compressed mixture of powdered metals, alloys, and/or non-metallic components. More specifically, as discussed in greater detail below, the disclosed metal-cored aluminum wire embodiments include a core that at least partially melts at a relatively low temperature, which prevents a portion of the powdered core from being carried away by the shielding gas, thereby improving the deposition rate of the wire during manufacturing. Accordingly, for the metal-cored aluminum wire embodiments discussed below, the core includes at least one alloy having a low melting point, relative to the melting points of the individual elements of the alloy, relative to the melting points of other components of the core, relative to the melting point of the sheath, or a combination thereof.

For example, for the metal-cored aluminum wire embodiments discussed below, one or more alloying elements are present within the core as an alloy (e.g., eutectic alloy or near-eutectic alloy) having a melting point (or solidus) that is substantially lower than the melting points of the individual elements of the alloy. In certain embodiments, the core of the metal-cored aluminum wire may include at least one alloy having a melting point (or solidus) that is substantially lower than the melting points (or solidi) of other powdered metallic components of the core. In certain embodiments, the composition of the core may be such that there is a substantial difference between the temperature at which the core begins to melt (i.e., the solidus of the core) and the temperature at which the sheath begins to melt (i.e., the solidus of the sheath). As discussed below, the presently disclosed metal-cored aluminum wires enable the production of low-porosity and high-strength aluminum parts at a high deposition rate. Moreover, as discussed in greater detail below, the presently disclosed metal-cored aluminum wire designs enable the production of aluminum alloy parts having wide range of different aluminum chemistries. Further, the disclosed metal-cored aluminum wire enables significantly more flexibility on batch quantities, allowing for the on-demand production of limited numbers of specialized wires whose chemistries are precisely tuned to match the compositions of particular part specifications. Further, in contrast with solid aluminum wires, the composition of the disclosed metal-cored aluminum wire does not significantly impact the ability to manufacture the wire.

Figure 1:
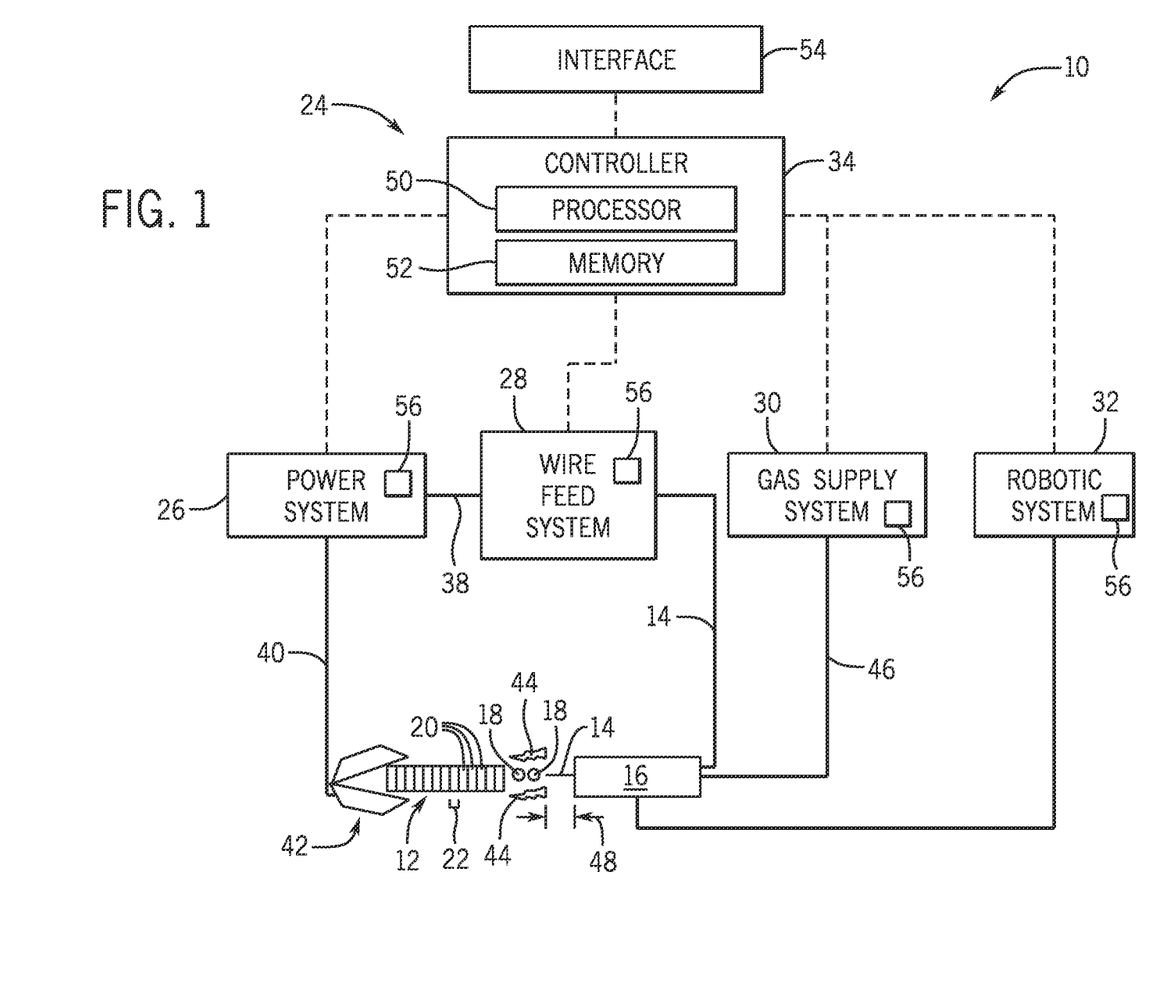
FIG. 1 is a schematic of an embodiment of an additive manufacturing system that utilizes metal-cored aluminum wire as a source material, in accordance with the present disclosure.

Turning to FIG. 1, an embodiment of an additive manufacturing system 10 is illustrated that additively forms (e.g., prints, builds) an aluminum alloy part 12 using a metal-cored aluminum wire 14, in accordance with the present disclosure. In general, the additive manufacturing system 10 includes a torch 16 that deposits molten droplets 18 of a metal-cored aluminum wire 14 to form (e.g., print, build) the part 12 in a deposit-by-deposit and/or layer-by-layer fashion. A deposit 20, as used herein, refers to a portion of the source material (i.e., the metal-cored aluminum wire 14) that has been transferred to, and solidified to form a smallest unit of the additively manufactured part 12. A layer 22, as used herein, refers to a collection of deposits 20 having a similar dimension (e.g., thickness) that are deposited alongside one another to form a larger portion of the part 12.

The illustrated additive manufacturing system 10 has a number of subsystems, including a control system 24, a power system 26, a wire feed system 28, a gas supply system 30, and a robotic system 32. The control system 24 includes a controller 34 that executes instructions to generally control operation of the additive manufacturing system 10 to cause the part 12 to be manufactured. The power system 26 generally supplies power to the additive manufacturing system 10, and is illustrated as being coupled to the wire feed system 28 via a connection 38 and coupled to a portion of the part 12 via a connection 40 and a clamp 42 to provide a complete circuit between the power system 26, the torch 16, and the part 12. In the illustrated embodiment, the metal-cored aluminum wire 14 is electrified within the wire feed system 28 using power supplied by the power system 26, before the electrified wire 14 is provided to the torch 16 (e.g., directly or within a protective conduit). In another embodiment, the power system 26 may couple and directly supply power to the torch 16, and the metal-cored aluminum wire 14 may instead be electrified at the torch 16.

The power system 26 may generally include power conversion circuitry that receives input power from an alternating current power source (e.g., an AC power grid, an engine/generator set, or a combination thereof), conditions the input power, and provides DC or AC output power via the connection 38. The power system 26 may power the wire feed system 28 that, in turn, provides a feed of electrified metal-cored aluminum wire 14, in accordance with demands of the additive manufacturing system 10, to establish an arc 44 between the metal-cored aluminum wire 14 and the part 12. The power system 26 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the additive manufacturing system 10 during manufacture of the part 12.

The illustrated additive manufacturing system 10 includes a gas supply system 30 that supplies a shielding gas or shielding gas mixtures to the torch 16 during the additive manufacturing process. In the depicted embodiment, the gas supply system 30 is directly coupled to the torch 16 via a gas conduit 46. In another embodiment, the gas supply system 30 may instead be coupled to the wire feed system 28, and the wire feed system 28 may regulate the flow of gas from the gas supply system 30 to the torch 16. Shielding gas, as used herein, may refer to any inert gas or mixture of inert gases that may be provided to the arc and/or the molten deposit (e.g., droplets 18) in order to provide a substantially inert local atmosphere (e.g., reduced in oxygen or substantially free of oxygen) near the molten and solidifying portions of the part 12 during additive manufacturing. In certain embodiments, the shielding gas flow may be a shielding gas or shielding gas mixture (e.g., argon (Ar), helium (He), nitrogen ($N_2$), similar suitable shielding gases, or any mixtures thereof). For example, a shielding gas flow (e.g., delivered via the gas conduit 46) may be 100% Ar or 100% He. In certain embodiments, the shielding gas flow may be an Ar/He mixture (e.g., 50% Ar/50% He; 25% Ar/75% He), which is presently recognized to enable better quality for the part 12 than pure Ar or pure He alone, when used in combination with embodiments of the disclosed metal-cored aluminum wires 14.

Accordingly, the illustrated torch 16 generally receives the metal-cored aluminum wire 14 from the wire feed system 28, power from the power system 26, and a shielding gas flow from the gas supply system 30 in order to perform additive manufacturing of the aluminum part 12. During operation of the illustrated additive manufacturing system 10, the torch 16 and the part 12 are brought in close proximity so that the arc 44 may be struck and a portion of the wire 14 melted and transferred to the part 12. As such, the additive manufacturing system 10 illustrated in FIG. 1 includes the robotic system 32, which includes sensors, motors, gears, tracks, or other suitable mechanisms capable of measuring and modifying the position, angle, and/or separation distance of the torch 16 relative to the part 12. Additionally, the robotic system 32 may control operation of the torch 16 (e.g., activation/deactivation of the torch 16, distance 48 that the metal-cored wire 14 electrode extends from the torch 16). In certain embodiments, the part 12 being manufactured may, additionally or alternatively, be coupled to a robotic system, like the robotic system 32, capable of measuring and modifying the position, angle, and/or separation distance of the part 12 relative to the torch 16.

Once the torch 16 illustrated in FIG. 1 is brought into proper position by the robotic system 32, an arc 44 is struck between the part 12 and the electrified aluminum metal-cored wire 14 that extends from the torch 16. A portion of the aluminum metal-cored wire 14 is melted (e.g., droplets 18) by the heat of the arc 44 and transferred to form a deposit 20, and eventually a layer 22, of the part 12. In certain embodiments, the aluminum metal-cored wire 14 may be completely converted into molten droplets 18 by the heat of the arc 44 before beings transferred to the part 12 (e.g., electrospray transfer). In other embodiments, the electrified aluminum metal-cored wire 14 may briefly contact the part 12, and may form a brief short circuit that rapidly melts to form a molten droplet at the surface of the part 12 (e.g., controlled short-circuit transfer).

As mentioned, the control system 24 of the illustrated additive manufacturing system 10 has a controller 34, which includes a processor 50 and a memory 52 that executes instructions to control the formation of the deposits 20 during the additive manufacturing of the part 12. The illustrated controller system 24 includes an interface 54 (e.g., a computer workstation) that is communicatively coupled to the controller 34 and that provides parameters of the part 12 to the controller 34. For example, an operator may load a set of parameters for forming the part 12 into the interface 54, such as a three-dimensional model (e.g., computer aided design (CAD) model) produced by a three-dimensional 3D CAD tool. In some embodiments, the interface 54 and/or the controller 34 may then produce a set of instructions in the memory 52 of the controller 34 that, when executed by the processor 50, cause the additive manufacturing system 10 to produce the part 12 with a desired composition and dimensions, based on the parameters received at the interface 54.

In particular, the illustrated controller 34 is communicatively coupled to the various subsystems of the additive manufacturing system 10 (e.g., the power system 26, the wire feed system 28, the gas supply system 30, and the robotic system 32) and capable of providing control signals to each of these subsystems to cause the additive manufacture of the part 12. Further, the illustrated controller 34 is capable of receiving operational information from sensing devices 56 (e.g., positional sensors, flow sensors, voltage sensors, current sensors, wire feed speed sensors, temperature sensors, thermal imaging devices, cameras, or other suitable sensing devices) of these subsystems, and the processor 50 of the controller 34 may determine how to control these subsystems based on both the operational information and the instructions for the part 12 received from the interface 54. For example, the controller 34 may monitor and control the outputs of the various subsystems, such as the current/voltage output of the power system 26, the rate at which the aluminum metal-cored wire 14 is provided by the wire feeder system 28, the flow rate of the shielding gas provided by the gas supply system 30, and the positioning and movement of the torch 16, based on the instructions for the part 12 and based on feedback provided by the sensing devices 56 of these subsystems.

Aluminum alloys are generally classified into wrought alloys and cast alloys, and sub-classified into hardenable (e.g., heat-treatable) and non-hardenable (e.g., non-heat-treatable) materials. The most common alloying elements for aluminum alloys include: magnesium (Mg, melting point (MP)=1202° F.), manganese (Mn, MP=2275° F.), copper (Cu, MP=1981° F.), silicon (Si, MP=2570° F.), iron (Fe, MP=2795° F.), titanium (Ti, MP=3034° F.), chromium (Cr, MP=3465° F.), nickel (Ni, MP=2647° F.), zinc (Zn, MP=788° F.), vanadium (V, MP=3434° F.), zirconium (Zr, MP=3366° F.), silver (Ag, MP=1764° F.), cadmium (Ni, MP=610° F.), lithium (Li, MP=358° F.), scandium (Sc, MP=2802° F.), lead (Pb, MP=622° F.), bismuth (Bi, MP=520° F.), tin (Sn, MP=450° F.), boron (B, MP=3767° F.), and beryllium (Be, MP=2349° F.). Pure aluminum has a melting point of approximately 1220° F., and low-alloy aluminum (e.g., 1xxx series aluminum alloy) can have a melting point that approaches 1215° F. As discussed in detail below, various alloying elements in various ranges can increase or decrease the melting point (e.g., the solidus and/or liquidus) of an alloy in different ways.

Figure 2A:
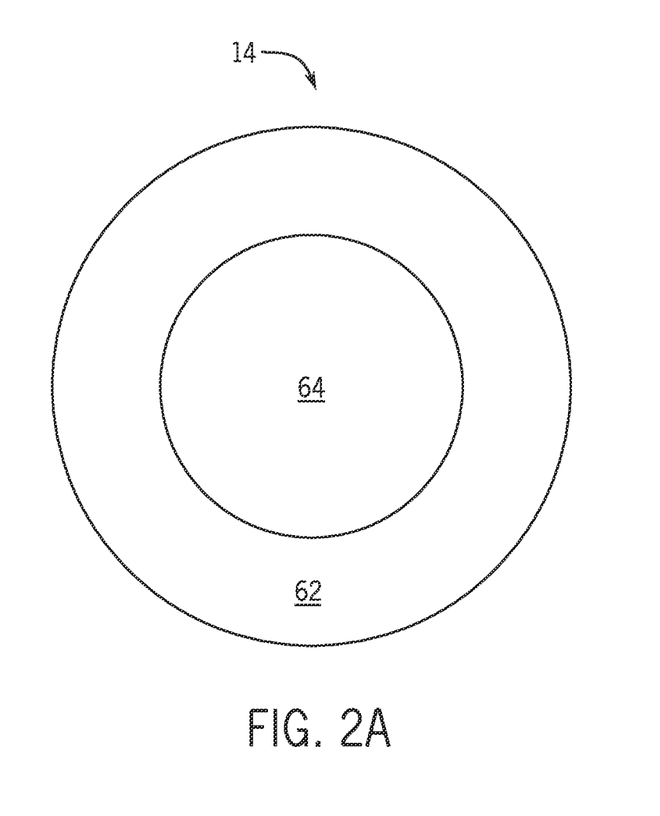
FIG. 2A is a cross-sectional schematic of a seamless metal-cored aluminum wire, in accordance with embodiments of the present technique.
Figure 2B:
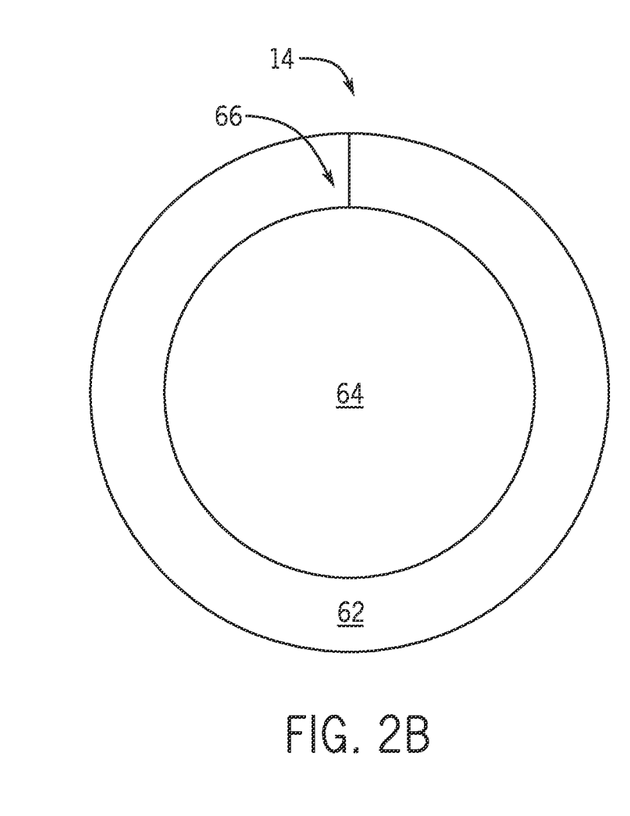
FIG. 2B is a cross-sectional schematic of a metal-cored aluminum wire that includes a seam, in accordance with embodiments of the present technique.

With the foregoing in mind, FIGS. 2A and 2B illustrate schematic, cross-sectional views of different embodiments of a metal-cored aluminum wire 14. The metal-cored aluminum wire 14 illustrated in FIG. 2A includes a seamless, metallic sheath 62 that encircles (e.g., surrounds, contains) a compressed granular core 64. In contrast, the metal-cored aluminum wire 14 illustrated in FIG. 2B includes a metallic sheath 62 that encircles (e.g., surrounds, contains) a compressed granular core 64, and further includes a seam 66 (e.g., a flush seam or a folded/bent seam) where the edges of the metal strip used to manufacture the sheath 62 meet. As discussed below, embodiments of the metal-cored aluminum wire 14 that lack a seam 66 may enable advantages in terms of reduced porosity within the additively manufactured part 12.

Figure 3:
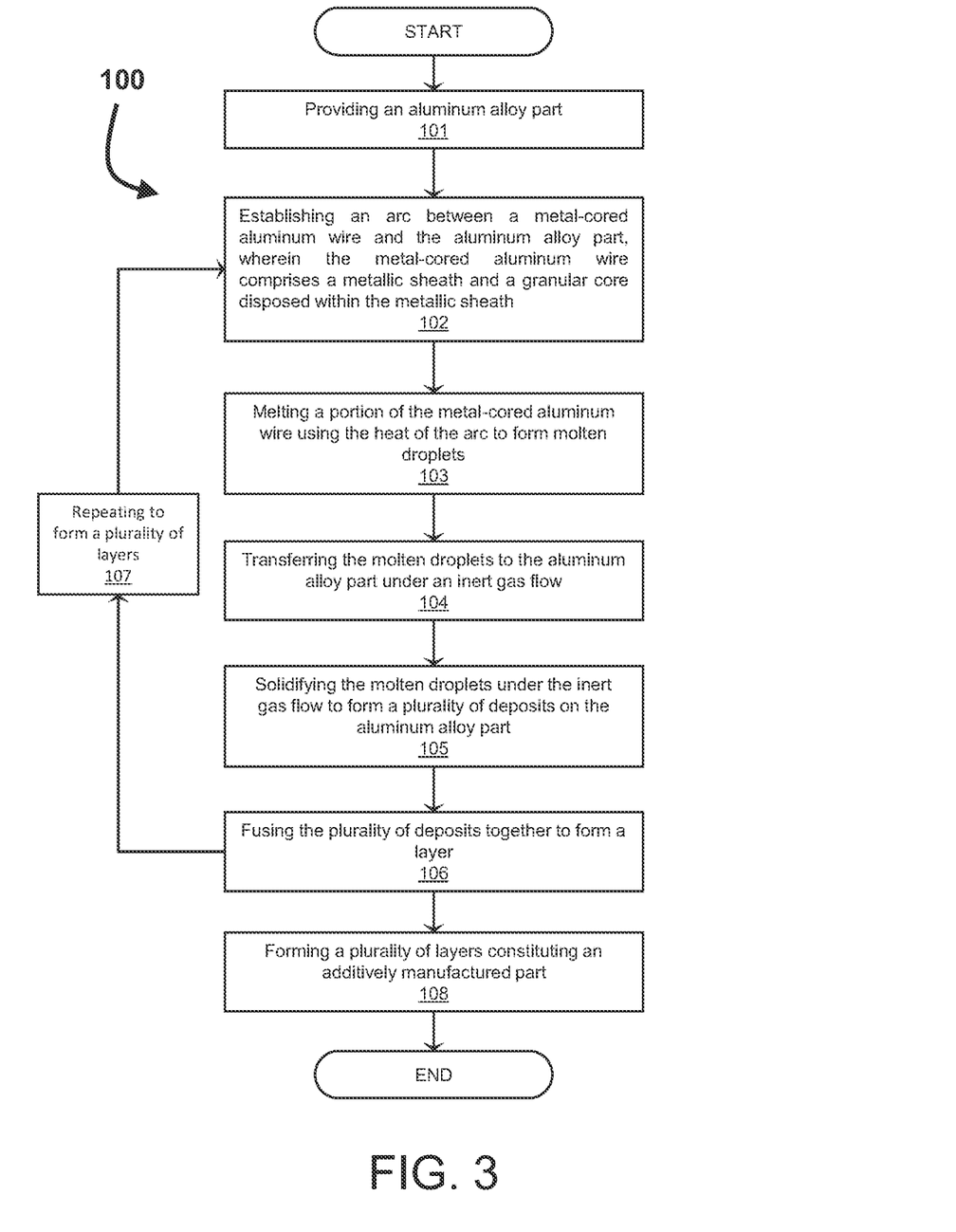
FIG. 3 is an example block diagram of the steps of an additive manufacturing method, in accordance with embodiments of the present technique.

In certain embodiments, an additively manufactured aluminum part may be manufactured by the method 100 illustrated in FIG. 3. According to this method 100, an additively manufactured aluminum part may be formed by the steps of: (a) providing an aluminum alloy part at step 101; (b) establishing an arc between a metal-cored aluminum wire and the aluminum alloy part, wherein the metal-cored aluminum wire comprises a metallic sheath and a granular core disposed within the metallic sheath at step 102; (c) melting a portion of the metal-cored aluminum wire using the heat of the arc to form molten droplets at step 103; (d) transferring the molten droplets to the aluminum alloy part under an inert gas flow at step 104; (e) solidifying the molten droplets under the inert gas flow to form a plurality of deposits on the aluminum alloy part at step 105; (f) fusing the plurality of deposits together to form a layer at step 106; and (g) repeating steps 101 to 106 ((b) through (f) above) to form a plurality of layers at step 107, wherein the plurality of layers constitutes an additively manufactured aluminum part at step 108.

In certain embodiments, the core 64 may account for less than approximately 20% (e.g., less than approximately 15%, less than approximately 10%, less than approximately 5%) of the weight of the wire 14, and approximately 80% or more of the weight of the wire 14 may be contributed by the sheath 62. It may be appreciated that the overall composition of a metal-cored aluminum wire 14 may be generally tuned to match the desired composition of a particular part 12 being manufactured. Furthermore, the overall composition of the metal-cored aluminum wire 14 can be determined based on the composition of the sheath 62, the contribution of the sheath 62 to the total weight of the wire 14, the composition of the core 64, and the contribution of the core 64 to the total weight of the wire 14.

As discussed above, a shielding gas may be provided by the shielding gas system 32 to reduce oxygen and moisture content near the molten droplets 18 and solidifying deposits 20 and layers 22. Since the shielding gas may have a relatively high flow rate, it is presently recognized that a portion of the powdered core 64 of a metal-cored aluminum wire 14 can be carried away from the surface of the part 12 by the shielding gas. For example, when certain alloying elements are included in the core 64 as pure elemental powders (e.g., Mn, Ti, Si), the high melting point of these elemental powders can result in at least a portion the powders being carried away by the shielding gas such that they do not melt to become incorporated into the part 12. This can undesirably reduce the deposition rate of the additive manufacturing process, alter the composition of the deposit 20, the layer 22, and/or part 12, as well as increase the amount of particulates in the additive manufacturing environment.

As such, for the disclosed metal-cored aluminum wire 14, at least one metallic component within the core 64 of the wire 14 is an alloy having a substantially lower melting point (or solidus) than the melting point of the pure elements that make up the alloy. Additionally, in certain embodiments, at least one metallic component in the core 64 of the wire 14 has a melting point (or solidus) that is substantially lower than the melting point (or solidus) of other powdered components of the core 64. For such embodiments, it is believed that these lower melting components of the core 64 are the first to melt as the temperature of the wire 14 increases, and the higher melting powders are contained within (e.g., surrounded, captured, or trapped by) the liquefied lower melting components and are not easily carried away by the shielding gas flow. Additionally or alternatively, in certain embodiments, the core 64 of the metal-cored aluminum wire 14 has a substantially lower melting point (or solidus) relative to the melting point (or solidus) of the sheath 62. For such embodiments, the core 64 includes one or more powdered components that begin to melt at a lower temperature than the sheath 62. For such embodiments, it is believed that the relatively higher melting point (or solidus) of the sheath 62 enables the sheath 62 to remain intact to provide a path for current to flow until the core 64 is partially or completely liquefied at or near the arc 44.

With the foregoing in mind, specific considerations for the sheath 62 and the core 64 for embodiments of the metal-cored aluminum wire 14 are set forth below. For embodiments of the disclosed metal-cored aluminum wire 14, the metallic sheath 62 is formed from any suitable aluminum alloy. For example, in certain embodiments, the sheath 62 may be made of low-alloy aluminum (e.g., Al 1100, pure aluminum), or other aluminum alloys (e.g., Al 6005, Al 6061). By specific example, in certain embodiments, the sheath 62 may be made from a 6xxx series aluminum alloy (e.g., Al 6063), which may have a melting point of approximately 1080° F. (solidus) to approximately 1210° F. (liquidus). In other embodiments, the sheath 62 may be made from a lower-alloy aluminum, such as a 1xxx series aluminum alloy (e.g., Al 1100), which enables a higher melting point (e.g., between a solidus of approximately 1190° F. and a liquidus of approximately 1215° F.) and easier extrusion. In certain other embodiments, the sheath 62 may be made from a 4xxx series aluminum alloy (e.g., Al 4043), which may have a melting point of approximately 1065° F. (solidus) to approximately 1170° F. (liquidus); or a 5xxx series aluminum alloy (e.g., Al 5052), which may have a melting point of approximately 1125° F. (solidus) to approximately 1200° F. (liquidus).

As mentioned above with respect to FIG. 2A, in certain embodiments, the sheath 62 of the disclosed metal-cored aluminum wires 14 may lack a seam or similar discontinuity. In other embodiments, the metal-cored aluminum wires 14 may be fabricated by bending and compressing a metal strip to form the sheath 62 around the granular core material 64, resulting in a seam 66 (e.g., a flush seam or a folded/bent seam) along the sheath 62 of the wire 14, as illustrated in FIG. 2B. Embodiments having a seamless sheath 62, as illustrated in FIG. 2A, may be formed from a seamless, extruded tube of aluminum or aluminum alloy. By using a seamless sheath 62, certain disclosed embodiments of the metal-cored aluminum wire 14 are less likely to retain organic residue (e.g., lubricants) from their fabrication process, and less likely to absorb moisture from the environment, than embodiments that include a seam 66. As such, the disclosed embodiments of the seamless metal-cored aluminum wire 14, as illustrated in FIG. 2A, reduce the delivery of such hydrogen-containing materials to the molten deposit, thereby reducing the aforementioned issues of hydrogen-induced porosity in the resulting deposit.

As mentioned above, the granular core 64 of the disclosed metal-cored aluminum wire 14 is generally a compressed, homogenous mixture of powders, including one or more powdered metallic components. In certain embodiments, the core 64 may also include up to approximately 5% of non-metal components (e.g., fluxing components, slagging components, components to control surface tension, arc stability components, components to control viscosity of the molten droplet 18, exothermic elements or compounds capable of increasing the deposition temperature, etc.). For example, in certain embodiments, the core 64 may include oxides (e.g., oxides of metals or metal alloys). By further example, in certain embodiments, the core 64 may include barium (Ba) to reduce porosity of the deposit. Additionally, as mentioned, it is generally desirable for the core 64 to be substantially free of moisture, organic lubricants, or other sources of diffusible hydrogen.

The powdered metallic components of the core 64 of the disclosed metal-cored aluminum wire 14 may be either pure metal powders, or powders of alloys. For example, in certain embodiments, the powdered alloys of the core 64 may be binary alloys (i.e., made of two elements), ternary alloys (i.e., made of three elements), or quaternary alloys (i.e., made of four elements). For example, it may be appreciated that, in different embodiments, three alloying elements of the wire 14 (e.g., Al, Mg, and Mn) may be included in the core 64 in different ways (e.g., as a mixture of pure Al, pure Mg, and pure Mn; as a mixture of an Al—Mg alloy and pure Mn; as an Al—Mg—Mn alloy; as a mixture of an Al—Mg alloy and an Al—Mg—Mn alloy), which may be optimized for desired characteristics of the part 12 and to minimize the amount of powdered core 64 in the wire 14.

Additionally, as mentioned above, the one or more powdered metallic components include at least one alloy having a substantially lower melting point (or solidus) than the melting point of the individual elements of that alloy. For example, in certain embodiments, the alloy may be a eutectic or near-eutectic alloy. A eutectic alloy is an alloy that includes two or more elements having particular relative concentrations that define a eutectic composition. When only two elements are present within a eutectic alloy, it is described as a binary eutectic system; however, systems with a greater number of elements (e.g., ternary systems, quaternary systems, etc.) are also possible. A eutectic alloy has a sharp melting point (i.e., solidus and liquidus are substantially the same) at its eutectic temperature, which is necessarily lower than each of the melting points of the individual elements that make up the alloy. It may be appreciated that not every set of elements has a eutectic composition, for example, aluminum-titanium alloys and aluminum-manganese alloys do not have a eutectic composition. Furthermore, polyeutectic systems with multiple eutectic compositions for a given set of elements are possible as well. Regardless, for a set of elements that has at least one eutectic composition, the lowest eutectic temperature represents the lowest possible melting point of the alloys that can be made from the set of elements.

In certain embodiments, the core 64 of the metal-cored aluminum wire 14 may include one or more binary eutectic alloys. More specifically, in certain embodiments, one or more of the binary eutectic alloys of the core 64 may be aluminum binary eutectic alloys. A non-limiting list of example aluminum binary eutectics includes: aluminum-beryllium (0.8% Be; melting point (MP)=1191° F.), aluminum-copper (33% Cu; MP=1019° F.), aluminum-iron (98% Fe; MP=1211° F.), aluminum-lithium (93% Li; MP=351° F.), aluminum-magnesium (36% Mg, MP=844° F.; and an even lower melting eutectic at 66% Mg; MP=819° F.), aluminum-silicon (12.6% Si; MP=1071° F.), and aluminum-zinc (94% zinc; MP=718° F.). In certain embodiments, ternary or quaternary eutectics of aluminum may be included in the core 64. In certain embodiments, eutectics of non-aluminum alloys may be included in the core 64. A non-limiting list of example includes titanium-boron, titanium-zirconium and zirconium-vanadium. In certain embodiments, the core 64 may be composed entirely of one or more eutectic alloys.

Additionally, in certain embodiments, the core 64 includes one or more powdered components that begin to melt at a lower temperature than the sheath 62 as the temperature of the metal-cored wire 14 increases at or near the arc 34. For example, in certain embodiments, the melting point (or solidus) of the sheath 62 may be at least 5% greater, at least 10% greater, at least 15% greater, at least 25% greater, at least 30% greater, at least 50% greater, or at least 70% greater than the melting point (or solidus) of the core 64. By specific example, in an embodiment, a wire 14 may have a sheath 62 made from a low-alloy aluminum alloy with a solidus of approximately 1190° F. and a core 64 that includes an aluminum-magnesium alloy with a melting point of approximately 819° F., such that the sheath 62 of the wire 14 has a solidus that is approximately 30% greater than the solidus of the granular core 64.

In certain embodiments of the metal-cored aluminum wire 14, the core 64 may include a mixture of metallic components, wherein at least one powdered metallic component has a melting point (or solidus) that is substantially lower than the melting points (or solidi) of other powdered metallic components of the core 64. For example, in certain embodiments, each metallic component of the core 64 may be classified as either high-melting (e.g., melting point or solidi greater than 1000° F.) or low-melting (e.g., melting points or solidi less than 1000° F.) components. For such embodiments, it may be desirable to have a sufficient amount of lower melting metallic components in the core 64 such that, when these metallic components melt and liquefy, there is a sufficient volume of these liquefied metallic components to contain (e.g., suspend, surround) the powders of the higher melting components of the core 64. For example, in certain embodiments, the lower melting components of the core 64 may account for greater than approximately 15%, greater than approximately 25%, greater than approximately 40%, or greater than approximately 60% of the core 64 by weight. It may be noted that, in certain embodiments, one or more higher melting components of the core 64 may only partially melt or dissolve before becoming incorporated into the deposit of the additively manufactured part.

In certain embodiments, each metallic component of the core 64 (e.g., aluminum-magnesium alloy, aluminum-silicon alloy) may be produced by homogenously melting the elements of the metallic component in the desired ratios to form a melt. The solidified melt may subsequently be milled, and the resulting powder may be sieved and fractioned. It is presently recognized that metallic powders produced in this manner have a lower oxygen content than powders produced by other methods (e.g., water or gas atomized powders), and, therefore, produce less alumina during additive manufacturing. In certain embodiments, the milled powders may have a grain size less than approximately 0.4 mm (e.g., approximately 45 µm to approximately 250 µm) to facilitate tight packing within the core 64. It may be noted that, while increasing grain size of the particles may also reduce the amount of the granular core 64 that can be carried away by the shielding gas, too large of a grain size can result in poor packing (e.g., excess void space) and undesired gas trapping within the core 64. In addition, in certain embodiments, the milled powders may have grain sizes less than 1 µm (as discussed in further detail below regarding aluminum metal matrix nano-composites). After preparing each of the powdered components of the core 64, the metallic components, as well as any non-metallic components, may be combined and mixed to form a substantially homogenous mixture of the powdered components of the core 64.

As set forth above, in certain embodiments, the sheath 62 may be a seamless sheath that is formed from an extruded aluminum alloy. For such embodiments, after cleaning an extruded aluminum tube to remove surface contaminates, the aforementioned homogenous mixture of the powdered components of the core 64 may be added to the seamless sheath 62, for example, using vibration filling. The filled sheath 62 also may, additionally or alternatively, be shaved to reduce the thickness of the sheath 62 and the diameter of the wire 14, as well as to provide a clean (e.g., oxide-free) surface to the wire 14. In certain embodiments, the wire 14 may, additionally or alternatively, be dried at a temperature less than the solidus of the core 54, to ensure that the wire 50 is substantially free of moisture. In certain embodiments, the wire 14 may be soft annealed at a temperature less than the solidus of the core 64, which improves or increases the ductility of the wire 14. In certain embodiments, the wire 14 may be drawn to a final desired diameter and, subsequently, drawing lubricants and/or oxide layers may be removed from the surface of the seamless sheath 62.

It may also be noted that the disclosed aluminum metal-cored wire design enables the formulations of deposits to be modified for enhanced properties. For example, the disclosed aluminum metal-cored wire 14 enables the production of a binary deposit that includes Al and Si. However, the formulation of this example aluminum metal-cored wire 14 may also be modified with the addition of a third alloying element, such as Mg, in a suitable quantity to render the deposit 20, the layer 22, or the part 12 as a whole, heat-treatable. As such, the aluminum metal-cored wire 14 enables flexibility that can enable enhanced properties into a deposit with minor variations in the composition of the core 64 and/or wire 14.

EXAMPLE 1

Table 1 describes a target composition for a deposit of a part (i.e., an Al 357 alloy deposit) capable of being formed using an embodiment of the metal-cored aluminum wire 14 during an additive manufacturing operation. It may be appreciated that elements indicated by maximum values alone are not required to be present by the specification; however, the indicated maximum values should be respected in this example.

TABLE 1

Desired deposit composition and melting points for each of the alloying elements for example 1.

| Element | wt % | Melting Point (° F.) |
| --- | --- | --- |
| Si | 6.5-7.5 | 2570 |
| Fe | 0.15 max | 2795 |
| Cu | 0.05 max | 1981 |
| Mn | 0.03 max | 2275 |
| Mg | 0.45-0.6 | 1202 |
| Zn | 0.05 max | 788 |
| Ti | 0.20 max | 3038 |
| Others (each) | 0.05 max | |
| Others (total) | 0.15 max | |
| Al | remainder | 1220 |

Table 2 includes the composition of the sheath 62, the core 64, and the total wire 14 for an embodiment of the metal-cored aluminum wire 14 capable of providing the deposit chemistry set forth above with respect to Table 1. For the example wire 14 represented in Table 2, the sheath 62 is an Al 6063 seamed or seamless sheath having the indicated composition. The core 64 of the example wire 14 is a mixture of three different powders, two of which (i.e., Al—Si and Al—Mg) are alloys having substantially lower melting points than the melting points of the individual elements of the respective alloys (i.e., Al, Si, and Mg). Additionally, for the example wire 14, the Al—Mg alloy is a eutectic alloy having the lowest possible melting point of all Al—Mg alloys. Also, for the example wire 14, the Al—Si alloy has a substantially lower melting point than the pure Ti powder of the core 64 and is present in suitable quantities to liquefy and surround (e.g., trap, capture) the powdered Ti component of the core 64, as discussed above. Furthermore, the melting point of the sheath 62, namely 1140° F. (solidus)-1210° F. (liquidus), is substantially greater than the solidus of the core 64, namely 819° F.

TABLE 2

Breakdown of the composition and contribution of the sheath 62 and the core 64 of the example embodiment of the metal-cored aluminum wire 14 for example 1, with the remaining elemental composition of the wire being aluminum and trace elements.

| | Sheath (Al 6063) | | | Core | | | | Total |
|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.55 | 86.0 | 0.47 | Al—Si | 1868 | 50 | 13.80 | 6.9 | 7.37 |
| Mg | 0.6 | | 0.52 | Al—Mg | 819 | 66 | 0.10 | 0.066 | 0.58 |
| Ti | 0.05 | | 0.04 | Ti | 3038 | 100 | 0.10 | 0.1 | 0.14 |

EXAMPLE 2

Table 3 describes another target composition of a deposit capable of being formed using another embodiment of the metal-cored aluminum wire 14 in an additive manufacturing operation. It may be appreciated that elements indicated by maximum values alone are not required to be present by the specification; however, the indicated maximum values should be respected in this example. Compared to the target deposit of Table 1, the target deposit composition set forth in Table 3 indicates a higher content of particular alloying elements, particularly Mg and Mn.

TABLE 3

Desired deposit composition and melting points for each of the alloying elements for example 2.

| Element | wt % | Melting Point (° F.) |
|---|---|---|
| Si | 0.6 max | 2570 |
| Fe | 0.4 max | 2795 |
| Cu | 0.1 max | 1981 |
| Mn | 0.9-1.5 | 2275 |
| Mg | 5.6-6.6 | 1202 |
| Cr | 0.05-0.20 | 3385 |
| Ti | 0.05-0.20 | 3038 |
| Al | remainder | 1220 |

It may be appreciated that the higher Mg and Mn content indicated in Table 3 may be useful to particular applications where enhanced part strength is desired. It may be useful to have the ability to raise Mn concentrations to maintain strength while lowering Mg content to improve the corrosion resistance of the part 12 in corrosive environments (e.g., marine environments), without being limited by solid wire manufacturing constraints associated with high Mn concentrations. The higher amounts of alloying elements set forth in Table 3 are more common among wrought aluminum alloys; however, it may be noted that even greater amounts of these alloying elements may be present in casting aluminum alloys. It should be noted that producing a solid-core aluminum wire capable of producing a deposit having the amounts of Mg and Mn indicated in Table 3, let alone even greater amounts, is impractical since drawing the solid wire becomes substantially more difficult with increasing content of these alloying elements. As such, embodiments of the disclosed metal-cored aluminum wire 14 enable the formation of high-alloy aluminum deposits, like the deposit indicated in Table 3, that are not possible or practical without the use of the metal-cored aluminum wire 14 described herein.

Table 4 includes the composition of the sheath 62, the core 64, and the total wire 14 for an embodiment of the metal-cored aluminum wire 14 capable of providing the deposit chemistry set forth above with respect to Table 3. For the example wire 14 represented in Table 4, the sheath 62 is an Al 6063 seamed or seamless sheath having the indicated composition. The core 64 of the example wire 14 is a mixture of four different powders, two of which (i.e., Al—Mg and Al—Mn) are alloys having substantially lower melting points than the melting points of the individual elements of the respective alloys (i.e., Al, Mg, and Mn). Additionally, for the example wire 14, the Al—Mg alloy is a eutectic alloy having the lowest possible melting point of all Al—Mg alloys. Also, for the example wire 14, the Al—Mg alloy has a substantially lower melting point than the other powdered components of the core 64, and it present in suitable quantities to liquefy and surround (e.g., trap, capture) the higher-melting powdered components of the core 64, as discussed above. Furthermore, the melting point of the sheath 62, namely 1140° F. (solidus)-1210° F. (liquidus), is substantially greater than the solidus of the core 64, namely 819° F.

TABLE 4

Breakdown of the composition and contribution of the sheath 62 and the core 64 of the example embodiment of the metal-cored aluminum wire 14 for example 2, with the remaining elemental composition of the wire being aluminum and trace elements.

| | Sheath (Al 6063) | | | Core | | | | | Total |
|---|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.55 | 85.8 | 0.47 | — | — | — | — | — | 0.47 |
| Mg | 0.6 | | 0.51 | Al—Mg | 819 | 66 | 9.00 | 5.94 | 6.45 |
| Ti | 0.05 | | 0.04 | Ti | 3038 | 100 | 0.10 | 0.1 | 0.14 |
| Cr | 0.08 | | 0.07 | Cr | 3385 | 100 | 0.10 | 0.1 | 0.17 |
| Mn | — | | — | Al—Mn | 1652 | 25 | 5.00 | 1.25 | 1.25 |

EXAMPLE 3

Table 5 describes another target composition (similar to Al 7005, used for weldable aluminum extrusions) of a deposit capable of being formed using an embodiment of the metal-cored aluminum wire 14 in an additive manufacturing operation. It may be appreciated that elements indicated by maximum values alone are not required to be present by the specification; however, the indicated maximum values should be respected in this specific example.

TABLE 5

Desired deposit composition and melting points for each of the alloying elements for example 3.

| Element | wt % | Melting Point (° F.) |
|---|---|---|
| Si | 0.35 max | 2570 |
| Fe | 0.4 max | 2795 |
| Cu | 0.1 max | 1981 |
| Mn | 0.2-0.7 | 2275 |
| Mg | 1.0-1.8 | 1202 |
| Cr | 0.06-0.02 | 3385 |
| Zn | 4.0-5.0 | 788 |
| Ti | 0.01-0.06 | 3038 |
| Zr | 0.08-0.20 | 3366 |
| Al | remainder | 1220 |

It may be appreciated that the higher alloying element content indicated in Table 5 may be useful to particular applications, for example, to provide a heat-treatable aluminum alloy having a composition similar to the Al 7005 alloy. This may be more useful than other aluminum alloys (e.g., 5356 aluminum alloy), which may be easier to produce due to their lower alloy content, but do not provide a heat-treatable deposit or part. In contrast, embodiments of the disclosed metal-cored aluminum wire 14 enable the formation of high-alloy, heat-treatable aluminum deposits, like the deposit indicated in Table 5, which may not be possible or practical without the use of the metal-cored aluminum wire 14 described herein.

Table 6 includes the composition of the sheath 62, the core 64, and the total wire 14 for an embodiment of the metal-cored aluminum wire 14 capable of providing the deposit chemistry set forth above with respect to Table 5. For the example wire 14 represented in Table 6, the sheath 62 is an Al 1100 seamed or seamless sheath having the indicated composition. The core 64 of the example wire 14 is a mixture of six different powders, four of which (i.e., Al—Mn, Al—Mg, Al—Zn, and Ti—Zr) are alloys having substantially lower melting points than the melting points of the individual elements of the respective alloys (i.e., Al, Mn, Mg, Zn, Ti, and Zr). Additionally, for the example wire 14, the Al—Mg and Al—Zn alloys are eutectic alloys having the lowest possible melting points of all Al—Mg and Al—Zn alloys, respectively. Also, for the example wire 14, both the Al—Mg and Al—Zn alloys have substantially lower melting points than the other powdered components of the core 64, and are present in suitable quantities to melt before and surround (e.g., trap, capture) the higher-melting powdered components of the core 64, as discussed above. Furthermore, the melting point of the sheath 62, namely 1190° F. (solidus)-1215° F. (liquidus), is substantially greater than the solidus of the core 64, namely 718° F.

TABLE 6

Breakdown of the composition and contribution of the sheath 62 and the core 64 of the example embodiment of the metal-cored aluminum wire 14 for example 3, with the remaining elemental composition of the wire being aluminum and trace elements.

| | Sheath (Al 1100) | | | Core | | | | | Total |
|---|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.3 | 87.86 | 0.26 | — | — | — | — | — | 0.26 |
| Fe | 0.3 | | 0.26 | — | — | — | — | — | 0.26 |

TABLE 6-continued

Breakdown of the composition and contribution of the sheath 62 and the core 64 of the example embodiment of the metal-cored aluminum wire 14 for example 3, with the remaining elemental composition of the wire being aluminum and trace elements.

| | Sheath (Al 1100) | | | Core | | | | | Total |
|---|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Cu | 0.04 | | 0.04 | — | — | — | — | — | 0.04 |
| Mn | — | | — | Al—Mn | 1652 | 25 | 1.00 | 0.25 | 0.25 |
| Mg | — | | — | Al—Mg | 819 | 66 | 2.00 | 1.32 | 1.32 |
| Ti | — | | — | Ti | 3038 | 100 | 0.01 | 0.01 | 0.06 |
| | | | | Ti—Zr | ~1800 | 34.4 | 0.15 | 0.05 | |
| Cr | — | | — | Cr | 3385 | 100 | 0.10 | 0.10 | 0.10 |
| Zn | — | | — | Al—Zn | 718 | 94 | 5.00 | 4.70 | 4.70 |
| Zr | — | | — | Ti—Zr | ~1800 | 65.6 | 0.15 | 0.10 | 0.10 |

EXAMPLE 4

Table 7 describes another target composition of a deposit (based on Al 520.0, an aluminum casting alloy) capable of being formed using an embodiment of the metal-cored aluminum wire 14 in an additive manufacturing operation. It may be appreciated that elements indicated by maximum values alone are not required to be present by the specification; however, the indicated maximum values should be respected in this example.

TABLE 7

Desired deposit composition and melting points for each of the alloying elements for example 4.

| Element | wt % | Melting Point (° F.) |
|---|---|---|
| Si | 0.25 max | 2570 |
| Fe | 0.3 max | 2795 |
| Cu | 0.25 max | 1981 |
| Mn | 0.15 max | 2275 |
| Mg | 9.5-10.6 | 1202 |
| Zn | 0.15 max | 788 |
| Ti | 0.25 max | 3038 |
| Al | remainder | 1220 |

It may be appreciated that the higher Mg content indicated in Table 7 may be useful to particular applications, for example, to provide a heat-treatable aluminum alloy having a composition similar to the Al 520.0 alloy. Embodiments of the disclosed metal-cored aluminum wire 14 enable the formation of high-alloy, heat-treatable, aluminum deposits, like the deposit indicated in Table 7, which are not possible or practical without the use of the metal-cored aluminum wire 14 described herein.

Table 8 includes the composition of the sheath 62, the core 64, and the total wire 14 for an embodiment of the metal-cored aluminum wire 14 capable of providing the deposit chemistry set forth above with respect to Table 7. For the example wire 14 represented in Table 8, the sheath 62 is an Al 1100 seamed or seamless sheath having the indicated composition. The core 64 of the example wire 14 is a single powdered alloy, Al—Mg, which is an alloy having a substantially lower melting point than the melting points of the individual elements of the alloys (i.e., Al and Mg). Additionally, for the example wire 14, the Al—Mg is a eutectic alloy having the lowest possible melting point of all Al—Mg alloys. Furthermore, the melting point of the sheath 62, namely 1190° F. (solidus)-1215° F. (liquidus), is substantially greater than the solidus of the core 64, namely 819° F.

TABLE 8

Breakdown of the composition and contribution of the sheath 62 and the core 64 of the example embodiment of the metal-cored aluminum wire 14 for example 4, with the remaining elemental composition of the wire being aluminum and trace elements.

| | Sheath (Al 1100) | | | Core | | | | | Total |
|---|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.3 | 84.5 | 0.26 | — | — | — | — | — | 0.26 |
| Fe | 0.3 | | 0.26 | — | — | — | — | — | 0.26 |
| Cu | 0.04 | | 0.04 | — | — | — | — | — | 0.04 |
| Mg | — | | — | Al—Mg | 819 | 66 | 15.50 | 10.23 | 10.23 |

EXAMPLE 5

Table 9 describes another target composition of a deposit (based on Al 206.0, an aluminum structural casting alloy) capable of being formed using an embodiment of the metal-cored aluminum wire 14 in an additive manufacturing operation. It may be appreciated that elements indicated by maximum values alone are not required to be present by the specification; however, the indicated maximum values should be respected in this example.

TABLE 9

Desired deposit composition and melting points for each of the alloying elements for example 5.

| Element | wt % | Melting Point (° F.) |
|---|---|---|
| Si | 0.1 max | 2570 |
| Fe | 0.15 max | 2795 |

TABLE 9-continued

Desired deposit composition and melting points for each of the alloying elements for example 5.

| Element | wt % | Melting Point (° F.) |
|---|---|---|
| Cu | 4.2-5.0 | 1981 |
| Mn | 0.2-0.5 | 2275 |
| Mg | 0.15-0.35 | 1202 |
| Ti | 0.15-0.3 | 3038 |
| Zn | 0.1 max | 788 |
| Al | remainder | 1220 |

Aluminum alloy 206.0 is commonly used for structural castings in heat-treated temper for automotive, aerospace, and other applications where high tensile strength, high yield strength, moderate elongation, and high fracture toughness are desired. Examples of parts that can be made using alloy 206.0 include gear housings and truck spring hanger castings. Embodiments of the disclosed metal-cored aluminum wire 14 enable the formation of high-alloy, heat-treatable, aluminum deposits, like the deposit indicated in Table 9, which are not possible or practical without the use of the metal-cored aluminum wire 14 described herein.

Table 10 includes the composition of the sheath 62, the core 64, and the total wire 14 for an embodiment of the metal-cored aluminum wire 14 capable of providing the deposit chemistry set forth above with respect to Table 9. For the example wire 14 represented in Table 10, the sheath 62 is an Al 1100 seamed or seamless sheath having the indicated composition. The core 64 of the example wire 14 is a mixture of four different powders, three of which (i.e., Al—Cu, Al—Mn, and Al—Mg) are alloys having substantially lower melting points than the melting points of the individual elements of the respective alloys (i.e., Al, Cu, Mn, and Mg). Additionally, for the example wire 14, the Al—Cu and Al—Mg alloys are eutectic alloys having the lowest possible melting points of all Al—Cu and Al—Mg alloys, respectively. Also, for the example wire 14, both the Al—Cu and Al—Mg alloys have substantially lower melting points than the other powdered components of the core 64, and are present in suitable quantities to melt before and surround (e.g., trap, capture) the higher-melting powdered components of the core 64, as discussed above. Furthermore, the melting point of the sheath 62, namely 1190° F. (solidus)-1215° F. (liquidus), is substantially greater than the solidus of the core 64, namely 819° F.

TABLE 10

Breakdown of the composition and contribution of the sheath 62 and the core 64 of the example embodiment of the metal-cored aluminum wire 14 for example 5, with the remaining elemental composition of the wire being aluminum and trace elements.

| | Sheath (Al 1100) | | | Core | | | | Total | |
|---|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.03 | 84.25 | 0.03 | — | — | — | — | — | 0.03 |
| Fe | 0.12 | | 0.10 | — | — | — | — | — | 0.12 |
| Cu | 0.09 | | 0.08 | Al—Cu | 1018 | 33 | 13.80 | 4.55 | 4.63 |
| Mn | — | | — | Al—Mn | 1652 | 25 | 1.30 | 0.33 | 0.33 |
| Mg | — | | — | Al—Mg | 819 | 66 | 0.40 | 0.26 | 0.26 |
| Ti | 0.005 | | 0.00 | Ti | 3038 | 100 | 0.25 | 0.25 | 0.26 |

According to another aspect of the present disclosure, metal-cored aluminum wire comprising aluminum metal matrix nano-composites (Al-MMNCs) may be formed by additive manufacturing. As compared to base aluminum alloys, Al-MMNCs exhibit properties such as high strength-to-weight ratio, excellent mechanical properties, resistance to creep at elevated temperatures good fatigue strength, and reduced crack sensitivity. Nanoscale reinforcement tends to have a greater reinforcing effect than microscale reinforcement in metallic systems due to the strong bonding at atomic level between the matrix and nanoparticles. Moreover, because there is both inter- and intra-granular nano-reinforcement in the metal matrix, both the Hall-Petch strengthening effect (grain size has a strong influence on strength since grain boundaries can hinder the dislocation movement) and Orowan strengthening effect (the non-shearable nanoparticles pin crossing dislocations and promote dislocations bowing around the particles (Orowan loops) under external load) contribute to material strengthening of Al-MMNCs.

Moreover, the addition of nanoparticles to an aluminum matrix changes the melting and solidifying processing during welding. The added nanoparticles reduce heat dissipation rate in the molten pool, making the welding zone is deeper with a narrower heat-affected zone. The nanoparticles increase viscosity in the molten pool, which suppress thermocapillary flow. This enables the control of microstructure of the weld.

Nanoparticles can cause some intrinsic challenges in the welding process. It may be difficult to retain the nanoscale grain size owning to the excessive grain growth during processing. Nanoparticles tend to agglomerate and cluster due to high surface energy, electrostatic, moisture adhesiveness, and attractive van der Waals forces. This can inhibit the uniform distribution of nanoparticles during processing. Therefore, in order to prevent the nanoparticles from dissolving, low heat input welding process is preferred, such as Miller Advanced Short Circuiting Arc Welding Process and Laser Hot-Wire Welding. To further facilitate the uniform distribution of nanoparticles in the weld, an ultrasonic-assisted method can be used.

Different kinds of ceramic nanoparticles may be added into the aluminum matrix to form Al-MMNCs, such as alumina ($Al_2O_3$), boron carbide ($B_4C$), carbon nanotubes (CNT), graphite (Gr), titanium dioxide ($TiO_2$), silicon carbide (SiCp), tungsten carbide (WC), silicon nitride ($Si_3N_4$), aluminum nitride (AlN), titanium carbide (TiC), and silica ($SiO_2$).

The powdered core 64 may contain Al-MMNCs that comprise an aluminum metal matrix and ceramic nanoparticles. The ceramic particles may have an average particle size of between approximately 5 nm and 500 nm, for example an average particle size of between approximately 10 and 250 nm, or an average particle size of between approximately 25 and 200 nm, or an average particle size of between approximately 30 and 150 nm, or an average particle size of between approximately 40 and 100 nm, or an average particle size of between approximately 50 and 70 nm, or an average grain size of approximately 60 nm. The aluminum metal matrix may have a grain size that is similar or equivalent to the particle size of the ceramic nanoparticles. In other embodiments, the aluminum metal matrix may have a grain size that is larger than the particle size of the ceramic nanoparticles.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method of forming an additively manufactured aluminum part, comprising:
   (a) providing an aluminum alloy part;
   (b) establishing an arc between a metal-cored aluminum wire and the aluminum alloy part, wherein the metal-cored aluminum wire comprises a metallic sheath and a granular core disposed within the metallic sheath;
   (c) melting a portion of the metal-cored aluminum wire using the heat of the arc to form molten droplets;
   (d) transferring the molten droplets to the aluminum alloy part under an inert gas flow; and
   (e) solidifying the molten droplets under the inert gas flow to form deposits on the aluminum alloy part;
   wherein the granular core comprises aluminum metal matrix nano-composites (Al-MMNCs) that comprise an aluminum metal matrix and ceramic nanoparticles, and
   wherein the ceramic nanoparticles have an average particle size of between 10 and 250 nm.

2. The method of claim 1, comprising providing, via a controller of an additive manufacturing system, a control signal to a robotic system of the additive manufacturing system to position a torch of the additive manufacturing system relative to the aluminum alloy part, wherein the torch receives and supplies the metal-cored aluminum wire and the inert gas flow toward the aluminum alloy part.

3. The method of claim 2, comprising providing, via the controller, a control signal to activate a wire feed system of the additive manufacturing system to feed the metal-cored aluminum wire to the torch of the additive manufacturing system at a particular wire feed speed.

4. The method of claim 3, comprising providing, via the controller, a control signal to activate a gas supply system of the additive manufacturing system to provide the inert gas flow to the torch of the additive manufacturing system at a particular inert gas flow rate.

5. The method of claim 4, comprising providing, via the controller, a control signal to activate a power system of the additive manufacturing system to provide power to establish the arc between the metal-cored aluminum wire and the aluminum alloy part at a particular voltage and a particular current.

6. The method of claim 1, wherein the metallic sheath is a 6xxx series aluminum alloy or a 1xxx series aluminum alloy.

7. The method of claim 1, wherein the metallic sheath of the metal-cored aluminum wire is a seamless metallic sheath comprising an extruded aluminum alloy tube.

8. The method of claim 1, wherein the solidus of the metallic sheath of the metal-cored aluminum wire is at least 5% greater than the solidus of the first alloy.

9. The method of claim 1, wherein the granular core of the metal-cored aluminum wire includes a first alloy comprising a plurality of elements, and wherein the first alloy has a solidus that is lower than each of the respective melting points of the plurality of elements of the first alloy.

10. The method of claim 9, wherein the first alloy is a eutectic alloy or near-eutectic alloy.

11. The method of claim 9, wherein the granular core of the metal-cored aluminum wire includes a second alloy that is a eutectic or near-eutectic alloy.

12. The method of claim 9, wherein the granular core of the metal-cored aluminum wire includes additional alloys, wherein each of the additional alloys has a solidus that is higher than the solidus of the first alloy, and wherein the granular core comprises greater than 25% of the first alloy by weight.

13. The method of claim 1, wherein the additively manufactured aluminum part consists essentially of the deposits.

14. The method of claim 1, wherein the metallic sheath is a 4xxx series aluminum alloy or a 5xxx series aluminum alloy.

15. The method of claim 14, wherein the ceramic nanoparticles comprise alumina ($Al_2O_3$).

16. The method of claim 14, wherein the ceramic nanoparticles comprise carbon nanotubes (CNT).

17. The method of claim 1, wherein the ceramic nanoparticles comprise alumina ($Al_2O_3$), boron carbide ($B_4C$), carbon nanotubes (CNT), graphite (Gr), titanium dioxide ($TiO_2$), silicon carbide (SiCp), tungsten carbide (WC), silicon nitride ($Si_3N_4$), aluminum nitride (AlN), titanium carbide (TiC), or silica ($SiO_2$).

18. The method of claim 1, wherein the ceramic nanoparticles have an average particle size of between approximately 25 and 200 nm.

19. The method of claim 18, wherein the ceramic nanoparticles have an average particle size of between approximately 40 and 100 nm.

20. The method of claim 1, wherein the grain size of the aluminum metal matrix is larger than the particle size of the ceramic nanoparticles.

21. The method of claim 1, further comprising:
(f) fusing the deposits together to form a layer; and
(g) repeating (b) to (f) to form a plurality of layers.

* * * * *